United States Patent Office 2,923,690
Patented Feb. 2, 1960

---

2,923,690

PREPARATION OF HIGH MOLECULAR WEIGHT POLYETHYLENE GLYCOLS

William Clarence Bedoit, Jr., Austin, Tex., assignor to Jefferson Chemical Company, Inc., Houston, Tex., a corporation of Delaware No Drawing. Application March 28, 1957
Serial No. 649,260

5 Claims. (Cl. 260—2)

This invention relates to a method for preparing high molecular weight polyethylene glycols.

In accordance with this invention, ethylene oxide is polymerized in the presence of a solid alkaline catalyst at an elevated temperature and pressure.

Polyethylene glycol polymers having molecular weights in the range of 6000 to 8000 are commercially available. These polymers, which are considered to be high molecular weight polymers, have been prepared by polymerizing ethylene oxide at room temperature in the presence of a catalyst. Since polymerization reactions under these conditions require many days or weeks for completion, such processes have obvious economic drawbacks.

Ethylene oxide is a highly reactive material and is known to be explosive in the presence of certain polymerization catalysts. This property of ethylene oxide has hindered the development of safe, elevated-temperature polymerization processes. Polymerization at elevated temperatures, however, has been effected by conducting the polymerization in the presence of a substantial amount of an inert solvent, such as benzene, toluene, cyclohexane and the like, which serves to minimize the force of the reaction.

A method has now been discovered whereby polyethylene glycols having molecular weights substantially in excess of 20,000 may be prepared. Surprisingly, this method may be safely conducted in the liquid phase at elevated temperatures in the absence of an inert solvent or diluent or of any other heat exchanging expedient.

In accordance with this process, ethylene oxide is polymerized in contact with a solid catalyst at a temperature in the range 80° to 150° C. and a pressure from about 7 to about 20 atmospheres. Polyethylene glycol products having molecular weights of at least about 20,000 may be prepared by this process. Under optimum conditions, the polymer products may have molecular weights in excess of 30,000. It should be understood that the term polyethylene glycol refers to polyoxyethylene glycols of the general formula $$HOCH_2CH_2—(OCH_2CH_2)_nCH_2CH_2OH$$

The nature of the alkaline catalyst employed is critical because most alkaline compounds do not promote the formation of high molecular weight polymers. The class of catalysts found suitable consists of potassium hydroxide, barium hydroxide and cesium carbonate. The effectiveness of these materials is in sharp contrast to that of similar materials, such as sodium hydroxide, which though promoting polymerization do not produce high molecular weight polymers. The behavior of cesium carbonate contrasts with that of the carbonates in general which exhibit little or no catalytic activity. Within the selected class, potassium hydroxide is the preferred catalyst. Table I compares the catalytic activity of various catalysts.

TABLE I

The polymerization of ethylene oxide on powdered alkaline metal hydroxides and carbonates [1]

| Catalyst | Moles oxide per mole of Catalyst | Reaction time, hours | Molecular weight by viscosity | Softening point, °C. |
|---|---|---|---|---|
| LiOH | No catalytic action. | | | |
| NaOH | 340 | 6 | 5,700 | 56 |
| KOH | 383 | 20 | [2] 27,100 | 65–66 |
| RbOH | 1,050 | 8 | 7,700 | 58 |
| CsOH | 1,430 | 18 | 4,960 | 56 |
| Ba(OH)₂ | 1,206 | 120 | 22,000 | 63–65.5 |
| K₂CO₃ | No catalytic action. | | | |
| Rb₂CO₃ | do | | | |
| Cs₂CO₃ | 2,135 | 95 | 24,000 | 64–65 |

[1] All runs were made in a 300-ml., stainless-steel, rocking autoclave.
[2] Extrapolated to infinite dilution.

The physical state of the catalyst is also of critical importance. The catalyst must be employed in its solid state in contrast to the employment of a catalyst in solution or dissolved in a liquid carrier. Only the solid form of the catalyst has the property of promoting heterogeneous polymerization which is necessary for the production of polymers having molecular weights in excess of 20,000. The particular solid shape of the catalyst is not material. Any convenient solid form in sufficient sub-division to provide an adequate surface area, such as a granular, powdered, pelleted or crushed catalyst will be suitable for this process. The effect of solid catalysts is contrasted with that of homogeneous catalyst action in Table II and the effect of a solvent in Table III below.

TABLE II

The polymerization of ethylene oxide by homogeneous catalysis

| Catalyst | Moles oxide per mole of catalyst [a] | Reaction time, hours | Molecular weight | Melting point, [b] C. |
|---|---|---|---|---|
| KOH dissolved in ethylene glycol [b] | 27.4 | 6 | 1,140 | 43 |
| KOH dissolved in polymer of run above [c] | 259.5 | 5 | 4,500 | 55 |
| Mg(OCH₃)₂ | 98 | 8 | 3,600 | 59–60 |
| NaOC₂H₅ | 618 | 22 | 10,450 | |
| KOC₂H₅ | 639 | 22 | 8,000 | 55 |
| RbOCH(CH₃)₂ | 1,650 | 5 | 8,000 | 55 |
| FeCl₃ | 125 | 26 | 5,260 | |

[a] Where glycols or polyglycols are present, they are included in the total moles of catalyst.
[b] 0.25 g. KOH, 5.0 g. ethylene glycol, 106 g. ethylene oxide.
[c] 0.25 g. KOH, 5.0 g. polyglycol 1150, 106 g. ethylene oxide.

TABLE III

The effect of solvent upon the polymerization of ethylene oxide with solid potassium hydroxide

| Solvent | Moles of oxide per mole of catalyst | Reaction time, hours | Molecular weight |
|---|---|---|---|
| None | 383 | 20 | 34,000 |
| Benzene [a] | 674 | 20.5 | 9,300 |
| Polyethylene glycol, 13,000 | 496 | 22 | 7,290 |

[a] 100 ml. of benzene, 0.20 g. powdered KOH, 120 ml. ethylene oxide.

The selected catalyst may be employed in a relatively minor amount as compared to the amount of ethylene oxide polymerized. Generally this will mean reacting at least 50 and preferably 150 or more moles of ethylene oxide per mole of catalyst. Expressed in percent, this will be an amount of catalyst between about 0.001% and about 0.5% preferably .01–0.5% by weight based on the weight of the total amount of ethylene oxide reacted. Typical catalyst concentrations are shown in Table IV:

TABLE IV

*The effect of the final potassium hydroxide catalyst concentration on the molecular weight of the polymer*

| Moles oxide/mole KOH | Reaction time, hours | Actual [1] molecular weight by viscosity |
| --- | --- | --- |
| 47.8 | 4.75 | 15,300 |
| 127 | 12 | 13,000 |
| 325 | 23 | 25,000 |
| 383 | 20 | 34,000 |
| 1,170 | 67 | 21,500 |

[1] Based on a molar concentration of 0.11 moles/liter; not extrapolated to infinite dilution.

This process may be conducted at temperature from about 80° to about 150° C. It is preferable, however, to maintain the operating temperature in the range of 100° to 115° C.

A superatmospheric pressure is a necessary condition for the formation of the high molecular weight polymers. Generally, a pressure of at least about 7 atmospheres up to about 10 atmospheres will be adequate. Higher pressures, that is, pressures in the order of 20 atmospheres or more may also be effectively employed.

The polymerization reaction is conveniently conducted in a vessel which can be heated and in which the necessary operating pressures can be maintained. It is desirable to exclude air from the vessel during polymerization. A satisfactory procedure consists of first introducing the catalyst into the vessel followed by nitrogen scrubbing to remove the air therefrom. An initial minor portion of the ethylene oxide to be reacted, about 10–15 ml., is then pressured into the vessel. The vessel is brought to a temperature of about 100° C. and the pressure about 100 lbs. per square inch gauge. The contents of the vessel are stirred or agitated from the beginning of the reaction. The initial polymerization reaction will effect a rise in the pressure of the reaction vessel. When this increase in pressure subsides or has been substantially reduced, generally requiring about 20 minutes, additional ethylene oxide is added to the vessel. The reaction is continued and further additions of ethylene oxide made in like manner until the total desired desired amount of ethylene oxide has been added. The vessel is maintained under reaction conditions for a substantial length of time following the last addition of ethylene oxide in order to promote completion of the polymerization reaction. The polymerization product may be neutralized by the addition of about 200 p.s.i.g. of carbon dioxide and removed from the vessel while at an elevated temperature.

Gentle agitation of the vessel and its contents is maintained during the polymerization reaction. This agitation may be effected by rocking the reaction vessel or by actuating a stirring device in the vessel. In either case, care must be exercised so that dissolution of the catalyst is minimized during agitation. It will be appreciated that some of the catalyst will go into solution during the course of the reaction. Table V illustrates the effect of agitation and of catalyst subdivision.

TABLE V

| Catalyst | Moles of oxide, mole of catalyst | Reaction time, hours | Type of Agitation | Molecular weight | Melting point, ° C. |
| --- | --- | --- | --- | --- | --- |
| crushed KOH | 383 | 20 | rocking | 34,000 | 65–66 |
| 2 KOH pellets | 428 | 22 | do | 9,600 | |
| finely powdered KOH | 325 | 23 | do | 25,000 | |
| crushed KOH | 1,631 | 24 | rocking with ¾" steel ball. | 32,500 | 64–67 |
| powdered Cs$_2$CO$_3$ | 2,135 | 95 | rocking | 24,000 | 64–65 |

The following detailed examples illustrate the practice of this invention. The molecular weights of the polymer products were determined by the Staudinger method disclosed in an article by Staudinger and Lohmann Ann., 505, 41–51 (1933).

EXAMPLE I 0.44 gram of dry, powdered potassium hydroxide were placed in an autoclave mounted on a shaking device. The reaction vessel was assembled, flushed with nitrogen, and connected to a source of liquid ethylene oxide under pressure. 13 milliliters (ml.) of ethylene oxide were pressured into the vessel followed by activation of the shaking device and heating of the vessel to 110° C. The initial reaction pressure in the vessel amounted to 118 p.s.i.g. When the pressure in the vessel fell to 47 p.s.i.g., an additional 12 ml. of ethylene oxide were introduced. Polymerization was continued and additional increments of ethylene oxide introduced into the vessel until, after 4.2 hours, a total of 150 ml. of ethylene oxide had been introduced. Rocking of the vessel and maintenance of the reaction conditions after the last addition was continued so that the total reaction period amounted to 20 hours.

124 grams of the polyoxyethylene glycol product were removed from the autoclave. This product had a molecular weight of 27,000, as determined by the viscosity method of Staudinger and Lohmann, referred to above, and a melting point range of 64–67° C.

EXAMPLE II

Ethylene oxide was polymerized according to the method described in Example I but employing 0.25 gram of powdered cesium carbonate as the catalyst. The reaction conditions were maintained for a total elapsed time of 95 hours. The polymer product obtained had a molecular weight of 24,000 as determined by the above mentioned viscosity method.

EXAMPLE III

Ethylene oxide was polymerized according to the method described in Example I with the exception that 0.29 gram of powdered barium hydroxide were employed as the catalyst. The reaction conditions were maintained for a period of 120 hours. The polymer product obtained had a molecular weight of 22,000.

EXAMPLE IV

Ethylene oxide was polymerized in the presence of powdered potassium hydroxide according to the method described in Example I. The ethylene oxide was reacted in the proportion of 383 mols of ethylene oxide per mol of potassium hydroxide over a total reaction period of 20 hours. The polyethylene glycol product obtained had a molecular weight of 34,000.

Obviously many modifications and variations of the invention, as herebefore set forth, may be made without departing from the spirit and scope thereof, and therefore only such limitations should be imposed as are indicated in the appended claims.

I claim:

1. In a polymerization process for producing a polyethylene glycol, wherein ethylene oxide is contacted in the liquid phase with a solid alkaline catalyst under pressure and at a temperature of 80° to 150° C., the improvement which comprises employing in the reaction zone a catalyst selected from the group consisting of solid potassium hydroxide, solid barium hydroxide and solid cesium carbonate in the absence of an added liquid diluent, introducing ethylene oxide in liquid phase into contact with said solid catalyst and in the absence of added liquid diluent while maintaining the reaction zone under a pressure of at least seven atmospheres, continuing the introduction of liquid ethylene oxide into said reaction zone under said conditions until at least about 150 moles of ethylene oxide have been added per mole of catalyst, conducting the said heterogeneous polymerization for a reaction time of at least 20 hours, and recovering a polyethylene glycol having a molecular weight in excess of 20,000 as the resultant polymer product.

2. A process according to claim 1 in which said catalyst is solid potassium hydroxide.

3. A process according to claim 1 in which said catalyst is solid cesium carbonate.

4. A process according to claim 1 in which said catalyst is solid barium hydroxide.

5. In a polymerization process for producing a polyethylene glycol, wherein ethylene oxide is contacted in the liquid phase with a solid alkaline catalyst under pressure and at a temperature of 100–115° C., the improvement which comprises employing dry powdered potassium hydroxide in the absence of an added liquid diluent, introducing ethylene oxide in liquid phase into contact with said solid catalyst and in the absence of added liquid diluent while maintaining the reaction zone in gentle agitation and under a pressure of at least seven atmospheres, continuing the introduction of liquid ethylene oxide into said reaction zone under said conditions until at least about 325 moles of ethylene oxide have been added per mole of catalyst, conducting the said heterogeneous polymerization for a reaction time of at least 20 hours, and recovering a polyethylene glycol having a molecular weight in excess of 20,000 as the resultant polymer product.

References Cited in the file of this patent

UNITED STATES PATENTS

| | | |
|---|---|---|
| 1,976,678 | Wittwer | Oct. 9, 1934 |
| 2,674,619 | Lundsted | Apr. 6, 1956 |